United States Patent [19]

Moulin et al.

[11] 4,097,415
[45] Jun. 27, 1978

[54] PRODUCTION OF IMPROVED ANODES FOR SOLID ELECTROLYTE CAPACITORS

[75] Inventors: Jean-Claude Moulin; Balint Escher; Dominique Prince, all of Paris, France

[73] Assignee: Societe Lignes Telegraphiques et Telephoniques, Paris, France

[21] Appl. No.: 665,287

[22] Filed: Mar. 9, 1976

[30] Foreign Application Priority Data

Mar. 3, 1975 France .................................. 75 09029
Jun. 6, 1975 France .................................. 75 17382

[51] Int. Cl.² ............................................. H01B 1/02
[52] U.S. Cl. .................................... 252/512; 252/515;
428/539.5; 428/567; 75/211; 75/221; 75/222;
204/290 F; 75/174
[58] Field of Search ................. 252/515, 512, 518;
204/290 F; 75/174, 212, 222, 211, 221;
29/182.1; 428/567, 539.5

[56] References Cited

U.S. PATENT DOCUMENTS

| 2,386,544 | 10/1945 | Crowley | 75/222 X |
|---|---|---|---|
| 3,627,520 | 12/1971 | Rogers | 75/222 |
| 3,650,736 | 3/1972 | Broom | 75/222 X |
| 3,770,613 | 11/1973 | Chisholm | 204/290 F |
| 3,802,851 | 4/1974 | Dunham | 75/207 X |
| 3,846,273 | 11/1974 | Bianchi et al. | 204/290 F |
| 3,867,129 | 2/1975 | Ronneau et al. | 75/174 X |
| 3,926,773 | 12/1975 | Koziol et al. | 204/290 F |
| 3,977,958 | 8/1976 | Caldwell et al. | 204/290 F X |
| 3,984,208 | 10/1976 | Moulin et al. | 75/222 X |

FOREIGN PATENT DOCUMENTS 2,405,459   8/1974   Germany.

Primary Examiner—Benjamin R. Padgett
Assistant Examiner—E. Suzanne Parr
Attorney, Agent, or Firm—Carroll F. Palmer

[57] ABSTRACT

Improved anodes for solid electrolytic capacitors are produced by introducing in the anode body made of a film forming sintered metal powder one of the following additives : tungsten, molybdenum, vanadium and hafnium, at the most suitable step of the manufacturing process previous to sintering under one of the following forms : pure metal, oxide, sulphide. In a preferred embodiment the additive is introduced in the binder used for pelletizing. In another embodiment the additive is introduced by dipping the presintered anodes in a solution containing said additive.

10 Claims, 3 Drawing Figures

PRODUCTION OF IMPROVED ANODES FOR SOLID ELECTROLYTE CAPACITORS

BACKGROUND OF THE INVENTION AND PRIOR ART

The present invention is directed to the production of sintered tantalum anodes of the kind described in the U.S. Pat. No. 3,984,208 which contains from 100 to 20,000 parts per million of one of the elements or additives $N_2$, W, Mo, V and Hf. A preferred variant as disclosed in said U.S. Patent is manufactured by mixing a number of powders including a pure tantalum powder and at least one tantalum powder containing one of the aforesaid elements. It is likewise stated that the grain sizes of the powders of which the mixture is formed are preferably similar to one another.

It has been discovered that the improvements of the anodes are still obtained if the additional element or additive is introduced alone in a controlled quantity in a form and a step which is better adapted to the process of production. More particularly, the metallic additives may be used not only as metal powder but also in the form of salts obtained by combination with a non-metallic element of the sixth column of the periodic chart (oxygen, sulphur, etc...), the introduction taking place in any step of manufacture prior to sintering. For example, when the process of manufacture includes a presintering step which precedes the final sintering, as is usual for instance when the anode contact is welded to the anode (and not embedded in the mass of powder constituting the anode), the additive will be introduced into the anodes already presintered just before the sintering step. The anodes containing the additive will be referred to as "doped anodes". The main object of the invention is therefore to produce doped anodes with as little change as possible in the production process.

The introduction of the additive in pure form or in the form of a salt in a step of the process which precedes the sintering affords greater flexibility and makes it possible to break away from the condition in regard to the grain sizes of the powders set by the above patent.

The anodes produced by the application of the present invention have very useful electrical characteristics and more particularly increased resistance not only to reverse voltages but also to overcurrents. Thus, capacitors have been produced which withstand without failure more than one million cycles each comprising a zero-resistance charge and a short-circuit discharge, and even more complex cycles in the course of which there is applied to the capacitor during the discharge phase a reverse bias of a value of more than 0.4 times the rated voltage of the capacitor.

In accordance with a variant of the invention, the additive is introduced into the binder added to the tantalum powder, that is to say, at the beginning of the manufacture.

In accordance with another variant of the invention, the additive is introduced into the anode by impregnation, that is to say, by immersing the presintered anode body in a solution of a salt or an oxide of the additive, the said compound of the additive being decomposed at the time of the final sintering and liberating the desired additive.

DETAILED DESCRIPTION OF THE INVENTION

The invention will be readily understood from the following description and by reference to the accompanying figures, which are given as a non-limiting example of the application of the invention, and in which.

Figure 1:
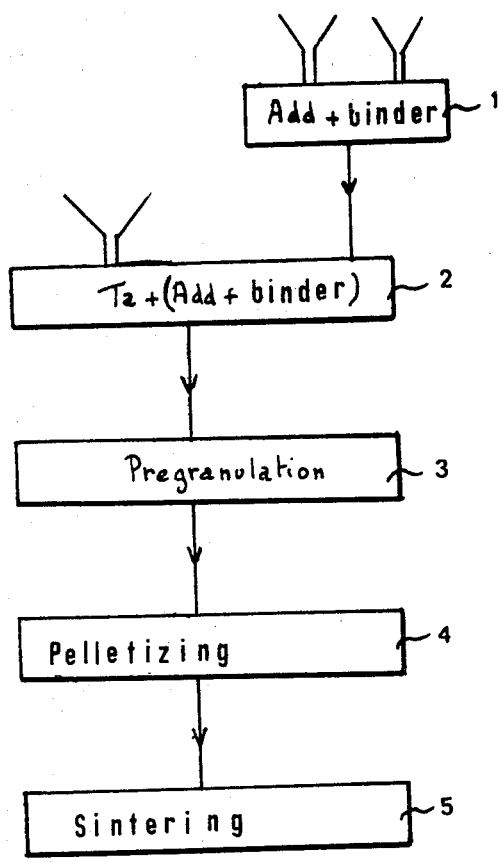
FIG. 1 is a block diagram of a first variant of the invention.
Figure 2:
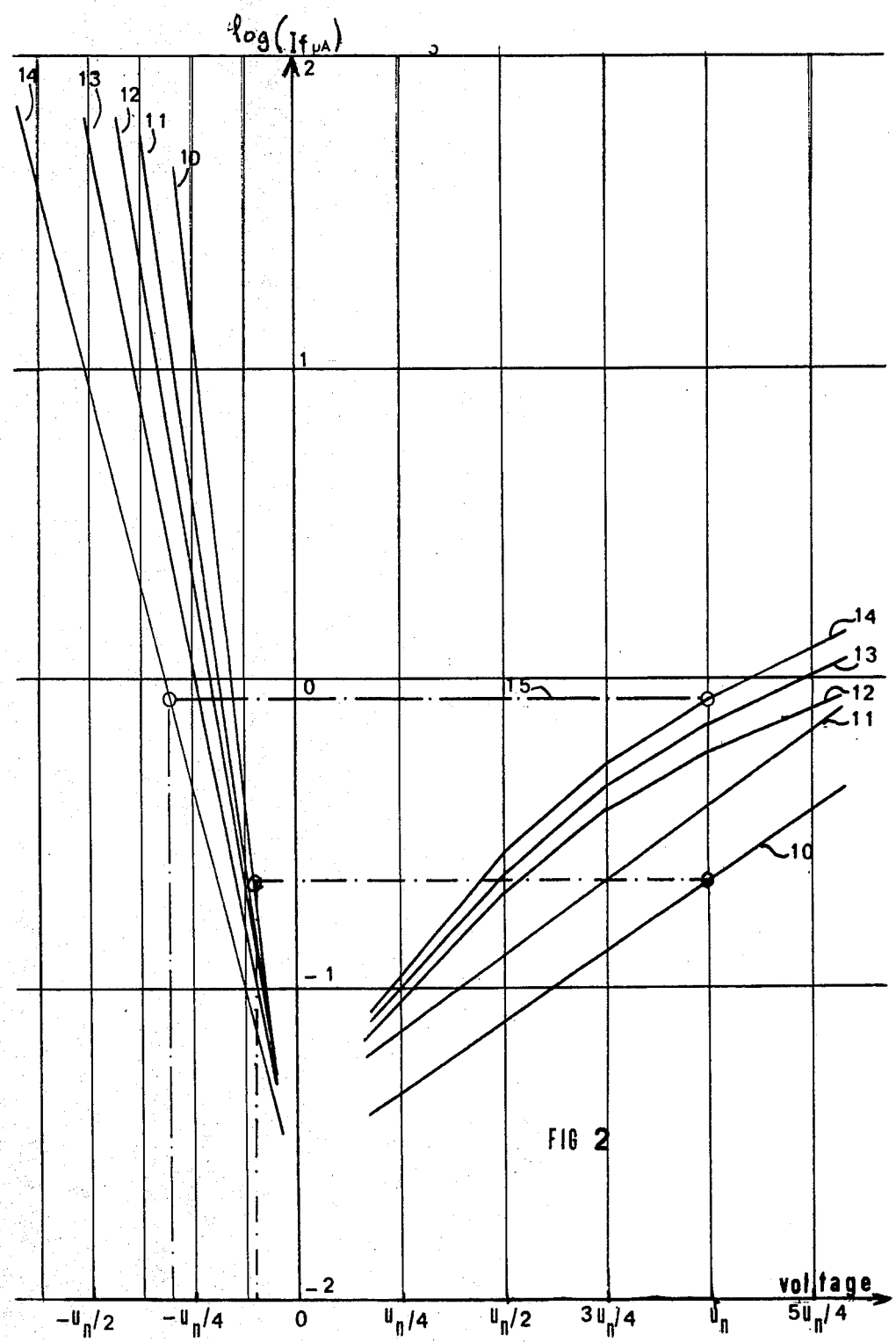
FIG. 2 shows a set of voltage-current characteristic curves of dry capacitors incorporating the anodes produced by the process according to FIG. 1 when the additive concentration varies.

There is shown in FIG. 1 a block diagram indicating the steps of manufacture of a sintered tantalum anode according to the variant of the invention which consists in introducing the additive in the form of a powder emulsified in the binder added to the tantalum powder for the purpose of pregranulation of the powder. One of the usual binders such as, for example, stearic acid is used in a relative concentration between 4% and 6% of the weight of the tantalum powder. The quantity of additive to be introduced can be calculated very precisely, on the basis of the desired final concentration. As has already been stated, these concentrations are comprised between a few hundred and 20,000 parts per million (by weight). The curves of FIG. 2 represent the characteristics of capacitors produced with anodes manufactured by the preferred variant of the invention, comprising molybdenum as the additive, in concentrations which are multiples of 700 parts per million. The introduction of the additive takes place as follows: the preset quantity of binder is introduced into a beaker with the corresponding calculated quantity of methyl alcohol or of acetone employed as solvent. The liquid is stirred with a mixer to complete dissolution. The desired quantity of additive powder is then added to the solution, whereafter the solvent is slowly evaporated with continuous stirring of the solution. There is obtained a dispersion of additive in the binder, which can be used with advantage in various percentages depending upon the desired concentration. The curves illustrated in FIG. 2, the additive employed is pure molybdenum. They correspond to mean values to cancel the dispersion which normally occurs in production. The characteristics of the capacitors obtained, for a given Mo concentration, are set out in the following Table No. 2. It is to be understood that this additive is referred to only as a non-limiting illustration of the invention.

This phase is represented by 1 in FIG. 1. The preparation of the powder by the addition of the binder is represented by 2. The pregranulation is shown at 3. The succeeding steps consisting of the pelletizing 4 and the sintering 5 are well known to the person skilled in the art. When no pregranulation step is used, the introduction takes nevertheless place by mixing with the binder or filler as mentioned above.

The curves of FIG. 2, which represent the logarithms of the leakage current as a function of the applied voltage, clearly show the influence of the molybdenum concentration on the voltage-current characteristics of the capacitors. The curves of FIG. 2 were plotted from measurements made on batches of capacitors having a capacitance of 22 $\mu$F, with a rated voltage $U_n$ of 40 volts. The curve 10 represents the characteristics of capacitors whose anode consists of pure tantalum.

Curve 11 represents those of capacitors whose anode contains 700 parts per million of molybdenum. The curves 12, 13 and 14 represent respectively the characteristics of capacitors whose anodes contain 1,400, 2,100 and 2,800 parts per million of molybdenum respectively. Higher molybdenum concentrations give unacceptable leakage current values.

The dash-dotted lines 15 make it possible to measure, in the case of capacitors doped with 2,800 ppm and reference capacitors, the reverse voltage at which the leakage current is equal to the leakage current at the rated voltage $U_n$ and to show the improvement resulting from the use of the additive. It can be seen from the curves that, in the case of capacitors having an anode consisting of pure tantalum (curve 10), the equality of the currents is obtained at $-U_n/_{10}$. In the case of capacitors whose anode contains 2,800 ppm of molybdenum, the equality of the leakage currents is obtained for an inverse voltage value higher in absolute value than $U_n/_4$.

Table No. 1 sets out the mean characteristics obtained when using as the additive Mo oxide, as a function of the proportion of additive.

Table No. 1

| Characteristics as a function of the rates of doping with Mo oxide: (Average over 10 pieces) | | | | |
|---|---|---|---|---|
| | Reference (0 ppm) | 500 ppm | 1,000 ppm | 1,500 ppm |
| If at Un (μA) | 0.29 | 0.3 | 0.4 | 0.37 |
| If at Un/$_4$ (μA) | 300 | 2.5 | 1 | 0.5 |
| Fd (%) | 1.16 | 1.07 | 0.91 | 0.75 |
| C(μF) at 25° C | 24.5 | 25 | 22.8 | 22.5 |
| ΔC/C −55° C(%) | −2.9 | −2.75 | −2.5 | −2.2 |
| ΔC/C +85° C(%) | 4.5 | −5 | +4.1 | +3.8 |

In Table No. 2, there are set out for identical capacitors the mean values of the characteristics obtained when the nature of the additive is changed, while the concentration level in molybdenum is kept constant and equal to 3,000 ppm.

Table No. 2

| Characteristics of capacitors as a function of the nature of the doping agent for a doping concentration equivalent eo 3,000 ppm. (Average over 10 pieces) | | | | |
|---|---|---|---|---|
| | Reference (undoped) | MoO$_3$ | MoS$_2$ | MoO$_2$+MoS$_2$ |
| If (μA) at Un | 0.05 | 0.06 | 0.1 | 0.08 |
| If (μA) at −Un/$_4$ | 10 | 0.05 | 0.2 | 0.03 |
| Fd (%) | 1.2 | 0.55 | 0.89 | 0.75 |
| C (μF) at 25° C | 6.4 | 6.3 | 6.27 | 6.22 |
| ΔC/C −55° C (%) | −3 | −2.2 | −2.61 | −8.6 |
| ΔC/C +85° C (%) | +5 | +4.3 | +3.8 | +4 |

Figure 3:
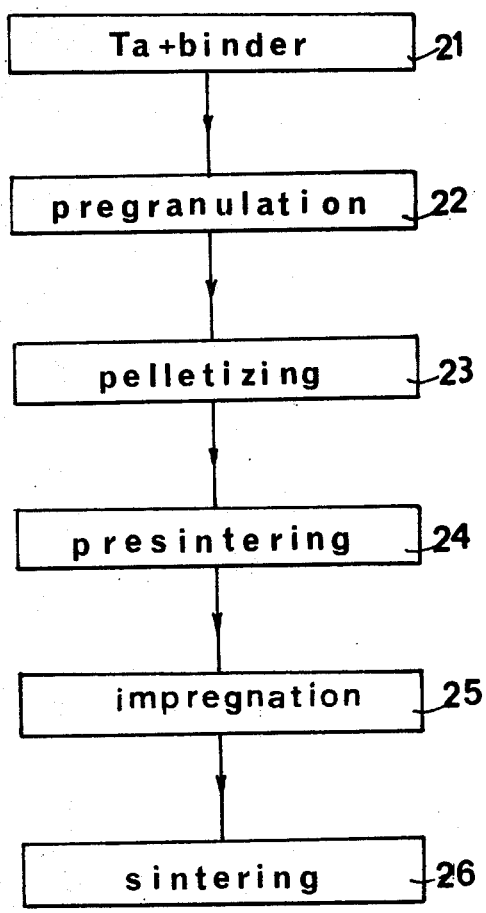
FIG. 3 is a block diagram of a second variant of the invention.

The block diagram of FIG. 3 shows the steps in the manufacture of a sintered tantalum anode with the introduction of the additive between a printing step and the final sintering step. The quantity of additive to be introduced can be calculated, taking into account the experimental conditions, once the desired final concentration has been set. As has already been mentioned, the optimum range of concentration extends between a few hundred and 20,000 parts per million by weight, measured in relation to the weight of tantalum. There is shown at 21 in FIG. 3 the mixture of tantalum powder and binder, and at 22 the pregranulation step, it being understood that the steps 21 and 22 may be omitted in some types of manufacture. The powder is thereafter pelletized at 23 and the pellets obtained are presintered (step No. 24) at a temperature not exceeding 1550° C, regardless of the type of anode which it is desired to produce. The rate of temperature rise in the course of the presintering operation is identical throughout to that usually employed in standard manufacture. After presintering, the anodes are cooled and the additive is introduced into the anodes, as represented by the step 25, by impregnation of the presintered anode. By way of example, when the additive is molybdenum, a saturated aqueous solution of molybdic anhydride is prepared at elevated temperature. The anodes are thereafter immersed for a few minutes in the saturated solution thus formed. They are then withdrawn from the bath, dried and transferred to the next step of the manufacture, consisting of the sintering 26. The step 26 comprises a very rapid temperature rise to the presintering temperature, and then follows the usual curve of temperature rise and temperature plateau used in the manufacture of capacitor anodes.

In Table No. 3, there are shown the mean characteristics of capacitors produced from an anode which has been presintered for 15 minutes at 1550° C. These anodes are thereafter immersed in a saturated aqueous solution of MoO$_3$ and then dried in the air and then in an oven at 80° C. The anodes are thereafter sintered at between 1650° and 2000° C in the usual manner. The doping level is about 1000 ppm.

Table No. 3

| (Average over 10 pieces) | | |
|---|---|---|
| | Undoped | Doped |
| If (μA) Un | 0.9 | 1.1 |
| If (μA) −Un/$_4$ | 200 | 0.45 |
| ZΩ at 100 KHz | 0.2 | 0.2 |
| ΔC −55° C | −4 | −3.5 |
| ΔC +85° C | 5 | 4 |
| Fd | 1.8 | 1.4 |

What we claim:

1. A method for producing anodes of film forming metal for dry electrolytic capacitors which comprises:
    providing a quantity of powdered film forming metal to constitute an anode,
    mixing said powder with a binder,
    pressing the resulting mixture into a pellet,
    introducing within said pellet an additive comprising a compound of an element selected from the group consisting of W, Mo, V and Hf with a non-metal element selected from the group consisting of O, S, Se and Te, and
    sintering the resulting pellet.

2. The method of claim 1 wherein said compound is molybdenum sulphide and said pellet is formed of tantalum.

3. The method of claim 1 wherein said additive is a mixture of molybdenum oxide and molybdenum sulphide.

4. A method for producing anodes of film forming metal for dry electrolyte capacitors which comprises the steps:
    providing a quantity of powdered film forming metal to constitute an anode,
    mixing said powder with a binder,
    pressing the resulting mixture into a pellet,
    presintering the pressed pellet,
    introducing within the presintered pellet an additive comprising an element selected from the group consisting of W, Mo, V and Hf, and
    sintering the resulting pellet.

5. The method of claim 4 wherein said additive consists of the pure element W, Mo, V or Hf.

6. The method of claim 4 wherein said additive is introduced within said pellet by dipping the pellet into a solution containing the additive.

7. The method of claim 6 wherein said solution contains molybdenum and said pellet is formed of tantalum.

8. A method for producing anodes of film forming metal for dry electrolytic capacitors comprising the steps:

providing a quantity of powdered film forming metal to constitute an anode, mixing said powder with a binder comprising at least one substance selected from the group consisting of the pure element W, Mo, V and Hf and compounds thereof with a non-metal element selected from the group consisting of O, S, Se and Te, pressing the resulting mixture into a pellet, and sintering the pellet.

9. The method of claim 4 wherein the quantity of said additive introduced into said presintered pellet is between about 100 and 20,000 parts per million by weight based upon the weight of the pellet.

10. An anode for dry electrolytic capacitors prepared by the process of claim 9.

* * * * *